APPARATUS FOR AND METHOD OF AUTOMATICALLY CHANGING TAPE CARTRIDGES

Filed Jan. 28, 1963 4 Sheets-Sheet 1

Carl O. Gellenthin, Jr.
INVENTOR.

BY James F. Weiler
Jefferson D. Giller
William A. Stout
Paul L. DeVerter II
ATTORNEYS Dec. 6, 1966 C. O. GELLENTHIN, JR 3,289,962

APPARATUS FOR AND METHOD OF AUTOMATICALLY CHANGING TAPE CARTRIDGES

Filed Jan. 28, 1963 4 Sheets-Sheet 2

Carl O. Gellenthin, Jr.
INVENTOR.

BY James F. Weiler
Jefferson D. Giller
William A. Stout
Paul L. DeVerter II
ATTORNEYS Carl O. Gellenthin, Jr.
INVENTOR.

BY James F. Weiler
Jefferson D. Giller
William A. Stout
Paul L. DeVerter II
ATTORNEYS Dec. 6, 1966 C. O. GELLENTHIN, JR 3,289,962

APPARATUS FOR AND METHOD OF AUTOMATICALLY CHANGING TAPE CARTRIDGES

Filed Jan. 28, 1963 4 Sheets-Sheet 4

Carl O. Gellenthin, Jr.
INVENTOR.

BY James F. Weiler
Jefferson D. Giller
William A. Stout
Paul L. DeVerter II
ATTORNEYS 3,289,962

APPARATUS FOR AND METHOD OF AUTOMATICALLY CHANGING TAPE CARTRIDGES

Carl O. Gellenthin, Jr., Houston, Tex., assignor, by direct and mesne assignments, of ninety-five percent to E. H. Hurst, Beaumont, Tex., and five percent to L. M. Keating, Houston, Tex.

Filed Jan. 28, 1963, Ser. No. 254,216
25 Claims. (Cl. 242—55.13)

Figures 1, 2, 3, 10:
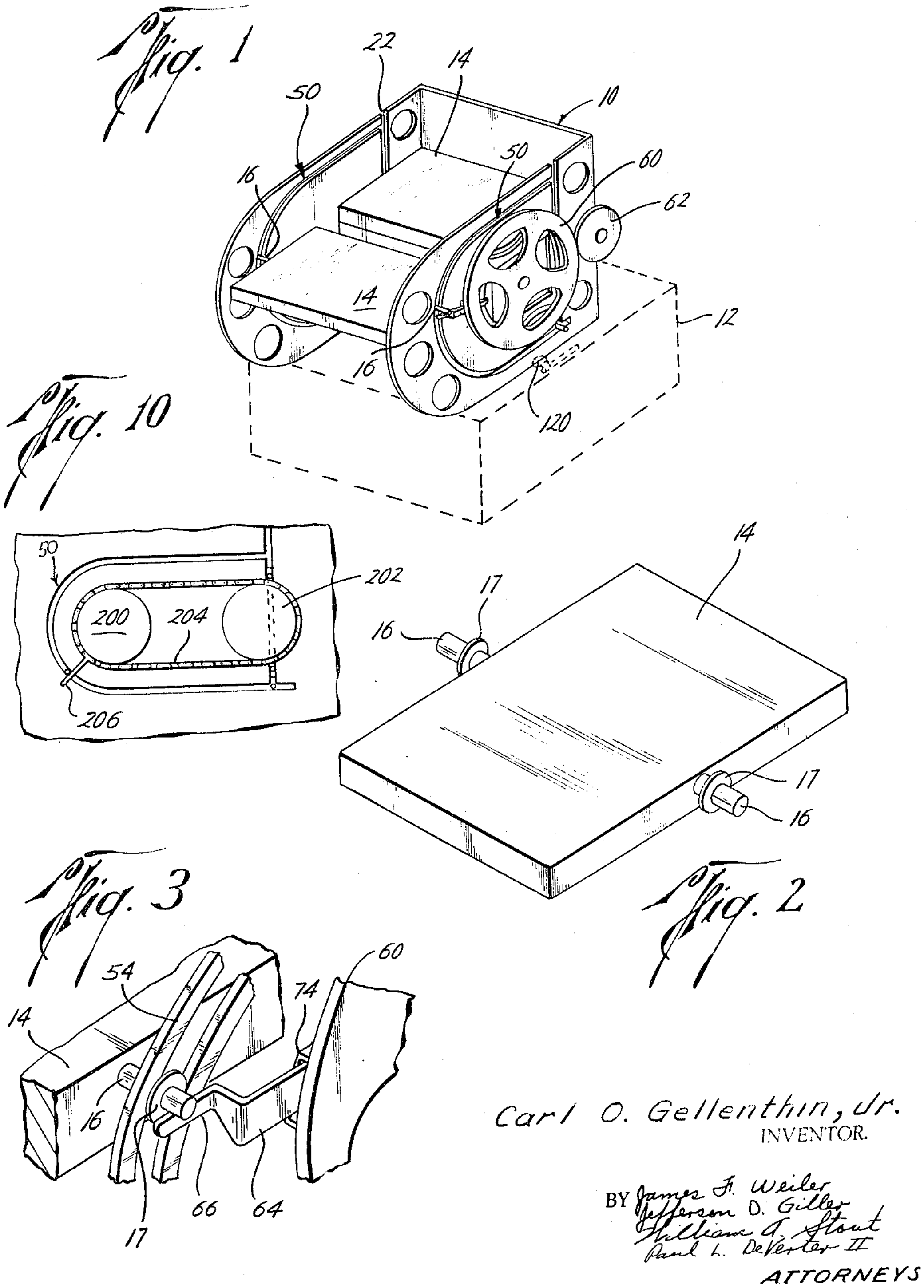

The present invention relates to an apparatus for and a method of automatically changing tape cartridges on a tape cartridge player, and more particularly, relates to such an apparatus for and method of automatically turning the cartridge player on, changing the tape cartridges during the period of use, and turning the player off.

Generally, in the field of musical background playing machines, a loop type of magnetic tape cartridge is used, one type of which is known as the Moebius type, which will play for certain intervals of time before repeating. The cartridge must be manually disconnected and a new cartridge inserted into the cartridge player if new music is desired.

It is a general object of the present invention to provide an apparatus for and a method of automatically changing tape cartridges on a cartridge player.

It is still a further object of the present invention to provide an apparatus for and a method of automatically controlling and performing the necessary functions of turning a tape cartridge player on, changing the tape cartridges during the period of use, and turning the tape player off, all at predetermined intervals.

A further object of the present invention is the provision of an apparatus for and a method of changing tape cartridges in a cartridge player by stacking a plurality of cartridges one above the other on the player, moving the lower cartridge into the playing position, removing the lower cartridge after it has been played from the player, placing the removed cartridge on the top of the stack, allowing the remainder of the stacked cartridges to move downwardly, and then moving the then lowest cartridge into playing position.

Yet a further object of the present invention is the provision of an apparatus for automatically changing tape cartridges which includes a pair of cartridge supporting tracks positioned on either side of the tape cartridges, means connected to the cartridges for supporting them from the tracks, and cartridge moving means for moving the cartridges in order, into and out of playing position on the player automatically.

A still further object of the present invention is the provision of an apparatus for and a method of automatically changing tape cartridges on a tape playing machine which includes a cartridge supporting track having an arcuate portion for supporting the cartridges as they are moved upwardly, a downwardly directed gravity feed portion for moving the cartridges downwardly adjacent the playing position, and a player feed portion for supporting the cartridges as they are moved into playing position.

A still further object of the present invention is the provision of rod supports provided on either side of the tape cartridges and above the center of gravity of the cartridge for supporting the cartridges between the tracks as they are moved.

Yet a further object of the present invention is the provision of an apparatus for automatically changing tape cartridges which includes rotatable means, an arm connected to the rotatable means and means for moving the shaft arm and the cartridges in one direction for moving the cartridges out of the playing position and placing them at the top of the stack of cartridges and then reversing the rotatable means and an arm for moving the then lowest cartridge into playing position.

A still further object of the present invention is the provision of an apparatus for automatically changing tape cartridges which includes a track positioned on either side of a plurality of stacked cartridges for supporting the cartridges and which includes a lower horizontal portion for supporting the lowest cartridge as it is moved out of playing position and from beneath the stack of cartridges, an arcuate portion for supporting the played cartridge as it is moved upwardly, a second horizontal extending portion for supporting the played cartridge as it is moved to the top of the stack, and a downwardly extending gravity feed portion connected between the first and second horizontal portions for feeding the cartridges in turn adjacent the playing position.

A still further object of the present invention is the provision of suitable electromechanical means and electrical switches for moving the cartridges into playing position, and after the cartridge has been played, to remove it from the playing position and onto a stack of tape cartridges, and automatically and in turn moving the lowest of the stack of tape cartridges into playing position, and to automatically change the cartridges and turn the playing machine on and off at predetermined intervals.

Yet a further object of the present invention is the provision of an apparatus for and a method of automatically actuating and deactuating the tape cartridge playing machine on those machines which require such actuation after and/or before movement of the cartridge into and out of the playing machine.

Figure 4:
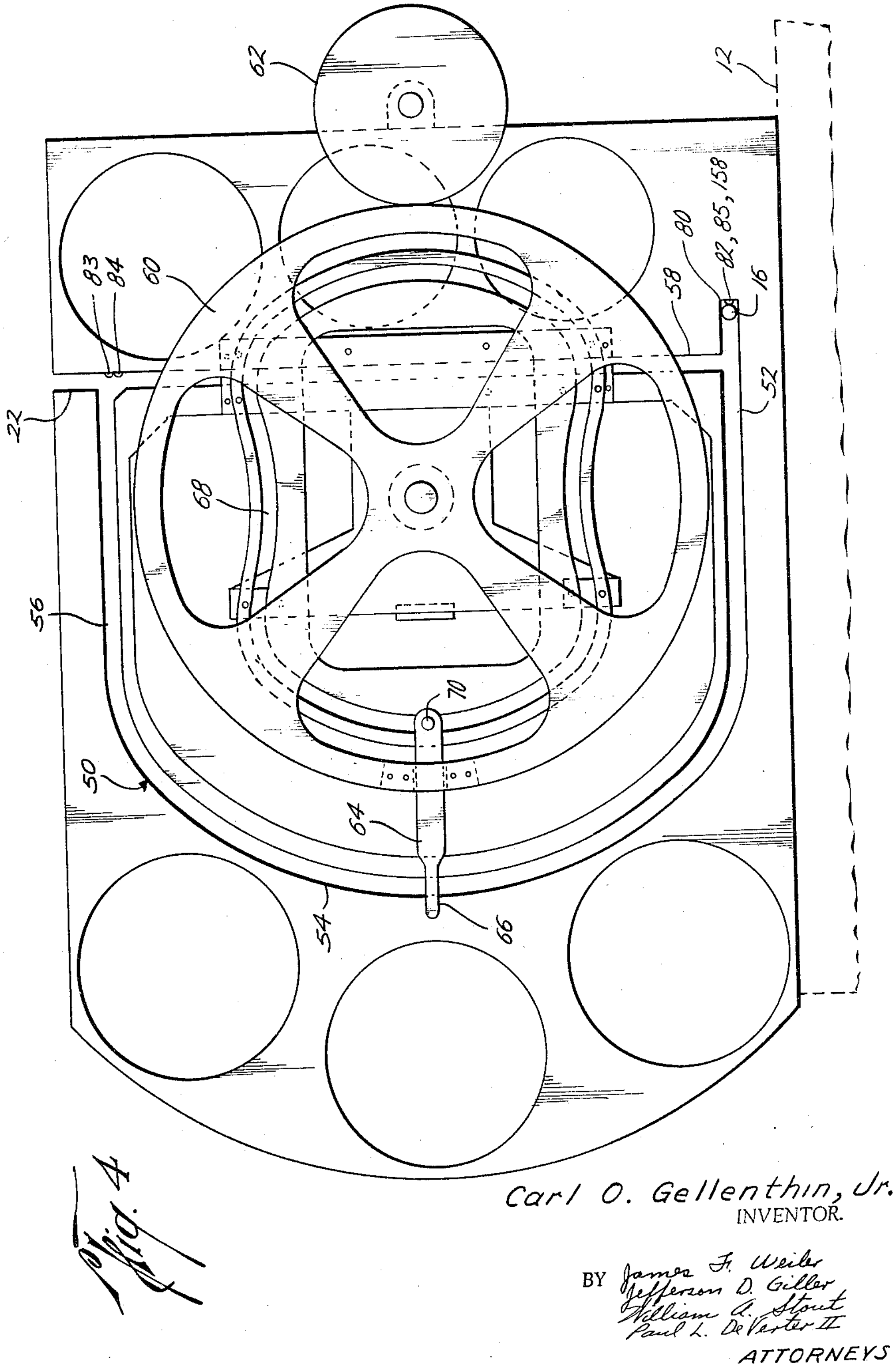
Figures 5, 6, 7:
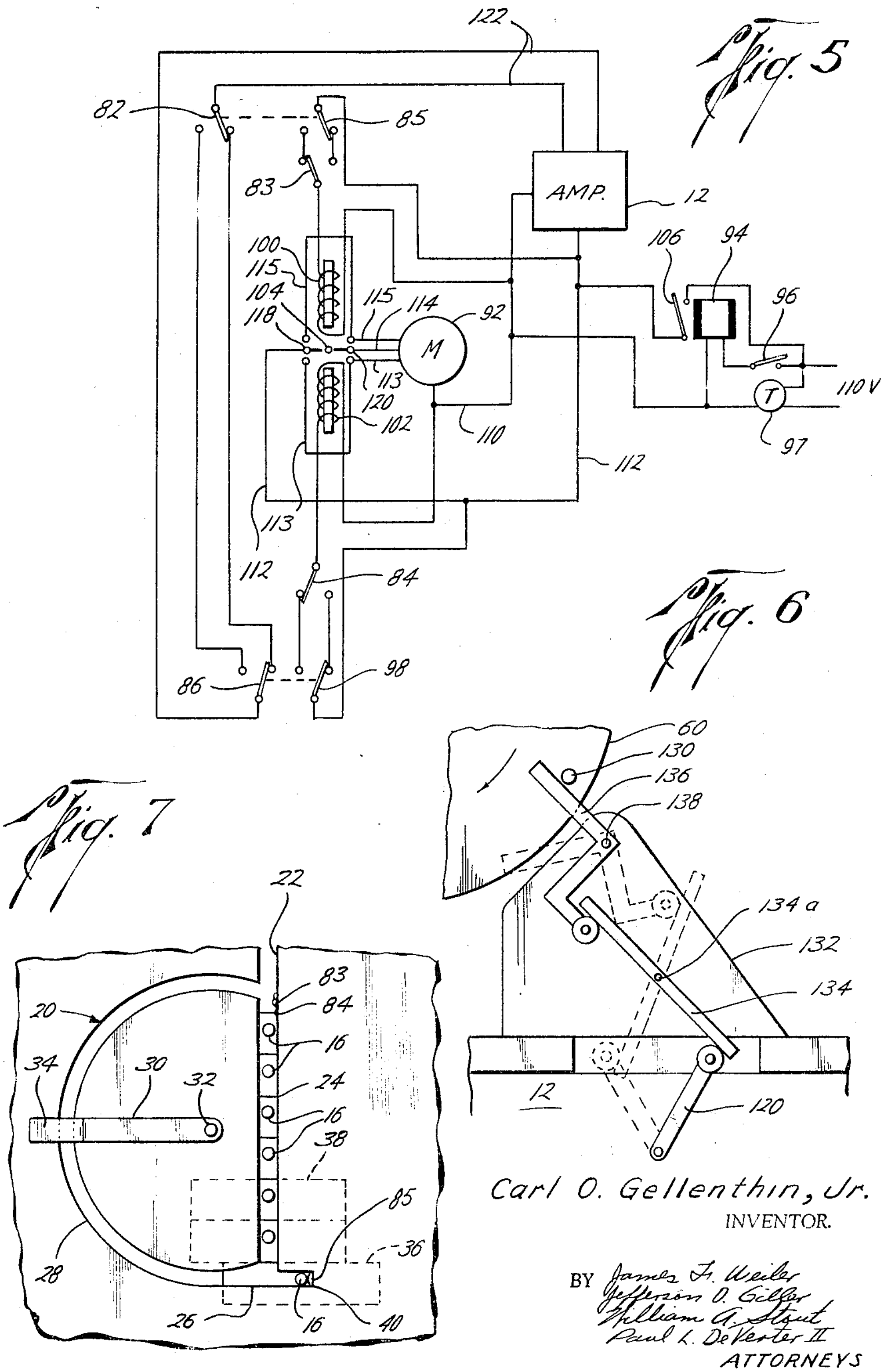
Figure 8:
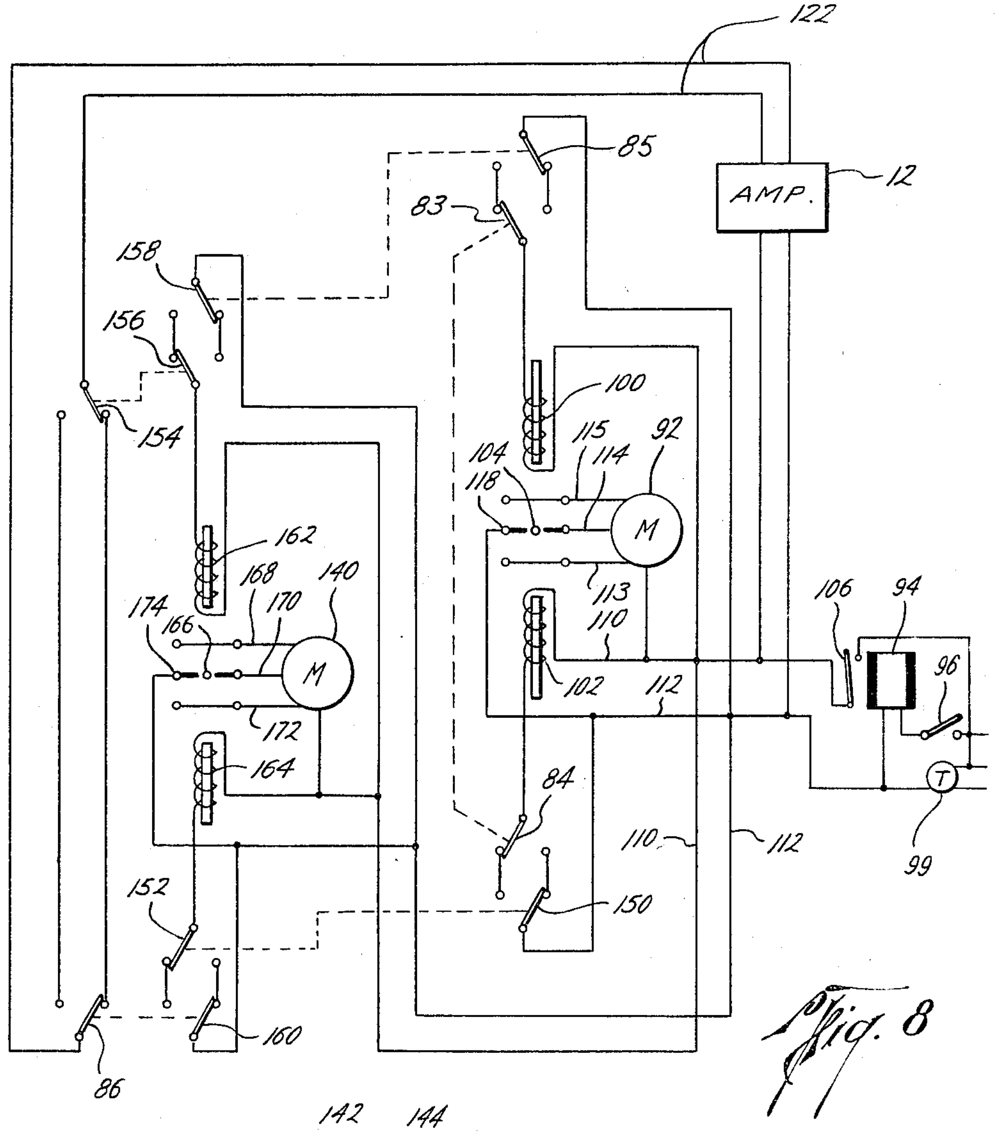
Figure 9:
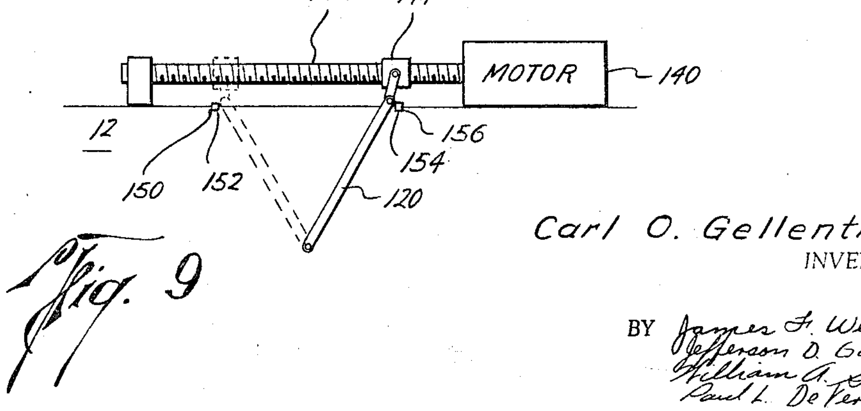

Other and further objects, features and advantages will be apparent from the following description of presently preferred embodiments of the invention, given for the purpose of disclosure and taken in conjunction with the accompanying drawings, where like character references designate like parts throughout the several views, and where, FIGURE 1 is a perspective view of the tape cartridge changer of the present invention in position on a cartridge playing machine, FIGURE 2 is an enlarged perspective view of a conventional tape cartridge provided with supports for being carried in the cartridge changer of FIGURE 1, FIGURE 3 is an enlarged fragmentary perspective view of a tape cartridge being carried in a supporting track and showing means for moving the cartridge about the track, FIGURE 4 is an enlarged side elevational view of the preferred embodiment of the present invention, FIGURE 5 is an electrically schematic diagram of the electrical control circuit of the present invention, FIGURE 6 is an elevational detailed view of one type of mechanism which may be used in connection with certain tape player machines for automatically resetting the playing machine, FIGURE 7 is a fragmentary and partially schematic side elevational view of a simplified tape cartridge changer, FIGURE 8 is an electrically schematic diagram of an electrical control circuit used in connection with certain types of player machines which requires resetting of the playing machine both after the insertion of a cartridge and before unloading of a cartridge from the player, FIGURE 9 is an elevational detail view of a mechanism for actuating a player lever switch on those players having such a lever, and FIGURE 10 is a fragmentary and partially schematic elevational view of an alternate cartridge means.

Referring now to the drawings, and in particularly to FIGURES 1 and 2, the reference numeral 10 generally designates the tape cartridge changer of the present invention which is adapted to be placed on a conventional tape cartridge playing machine 12. The playing machine 12 is conventional and constitutes no part of the present invention and no further description is believed necessary. The changer 10 automatically changes a plurality of tape cartridges 14 into and out of playing position on the tape playing machine 12. Referring now to FIGURE 2, the tape cartridges 14 are conventional and utilize a loop type of magnetic tape (not shown), one of which is generally known as the Moebius loop type, and includes an opening (not shown) and which when inserted on the top of the cartridge player 12 and moved transversely into playing position allows a magnetic pickup head and driving roller (not shown) from the cartridge player 12 to become positioned against the tape loop and automatically drives the magnetic tape and pick up the music or information recorded thereon. The actual tape cartridge 14 is a conventional item and forms no part of the present invention and no further description is believed necessary.

In the past however, attempts have been made to prolong the playing time of the individual tape cartridges by decreasing the playing speed which has resulted in a decrease in the fidelity of sound reproduction. Nevertheless, it has still been necesary to manually load and unload the tape cartridges 14 into and out of the tape playing machine 12 in order to prevent too frequent repeat of the same tape and therefore requires periodic attention or the replaying of the same tape at undesirable frequent intervals.

The present invention is directed to providing suitable supports 16 which are connected to each side of the conventional tape cartridge 14, preferably above the center of gravity of the cartridge, and providing an apparatus for automatically loading and unloading a plurality of tape cartridges 14 into and out of the cartridge player 12.

Generally, a pair of supporting tracks are provided on each side of the stack of tape cartridges 14 for supporting the cartridges as they are moved into and out of playing position.

Referring to FIGURE 7, a simplified embodiment of the present invention is shown providing supporting tracks and operating mechanism for automatically changing the tape cartridges 14. A plurality of tape cartridges 14 are placed between a pair of supporting tracks 20 by inserting the cartridge supports 16 into a track insertion portion 22 of the track 20 whereby the stack of cartridges 14 are held in and supported in a downwardly directed gravity feed portion 22 of the track 20. Thus, the lowest cartridge may be fed into playing position while the other cartridges are stacked thereon and await their turn to be played. A player feeder portion 26 of the track 20 is connected to the lower end of the gravity feed portion 24 whereby the lowest positioned cartridge 14 may be transversely moved along track portion 26 and into playing position. An arcuate portion 28 of the track 20 is provided connected from the feeder portion 26 to the top of the gravity feed portion 24 for supporting the cartridges as they are removed from playing position and placed atop the stack of cartridges awaiting their turn to be played.

In order to move the cartridges into and out of playing position and to the top of the gravity feed portion 24 of the track 20 a suitable cartridge moving means such as arm 30 connected to rotatable means such as a rotatable shaft 32 may be provided wherein the arm 30 includes an inwardly directed offset portion 34, as will be more fully described hereinafter in connection with the description of FIGURE 3. The offset portion 34 is adapted to contact the rods 16 which protrude through track 20 when the rods 16 are in the feeder portion 26 and the arcuate portion 28 of the track 20, but avoid contacting the protruding rods 16 when they are in the gravity feed portion 24. The arm offset 34 avoids the gravity feed track portion 24 since that track portion is positioned other than on a superinscribed circle passing through the arcuate portion 28. Thus, assuming tape cartridge 36, shown in doted outline in a playing position, has finished playing, the arm 30 will be rotated by suitable means clockwise to encounter the support 16 of the cartridge 36 moving it out of the feed portion 26 of the track and around the arcuate portion 28 and drop cartridge 36 into the gravity feed portion 24 on top of the stack of cartridges therein. After cartridge 36 is removed from the playing position, the next lower cartridge 38 will move downwardly to the bottom of the gravity feed track portion and into the feeder portion 26. After the arm 30 has moved tape cartridge 36 to the gravity feed track portion 24, the arm 30 is reversed so that the offset portion 34 will now be moved counterclockwise to move adjacent the protruding rod supports 16 of tape cartridge 38 which is now resting in the feeder portion 26 of the track, but not in playing position. As the offset portion 34 contacts cartridge 38, cartridge 38 will move to the extreme right end 40 of the feeder portion 26 where the rod 16 will contact a suitable control means 42 such as an electrical switch for stopping the movement of the arm 30. Thus, one complete cycle is performed automatically changing the tape cartridges 14 in the cartridge player 12. The cycling is controlled by means which will be more fully described hereinafter.

Preferably, in the apparatus shown in FIGURE 7, it is desirable that the arcuate portion 28 of the track have a sufficiently large enough radius in order that when the lowest tape cartridge, for instance cartridge 36, is unloaded from the player 12 it will horizontally clear the next higher tape cartridge, cartridge 38, prior to being raised vertically in the arcuate track 28. While it may be suitable to provide such as arcuate portion 28 with a sufficiently large radius, it may be that it will unduly lengthen the height of the gravity feed track portion 24 so as to have the tape cartridges drop too great a distance in the gravity feed. While this latter problem can be solved by increasing the number of tape cartridges in the gravity feed portion 24, this may be undesirable as tying up too great an inventory of tape cartridges at one location.

The track may be added to as best seen in FIGURES 1 and 4 to provide a track 50 having a first lower horizontal portion 52, which also serves as the player feed portion, an arcuate portion 54, a top horizontal portion 56 and a downwardly directed gravity feed portion 58. This particular contour track allows the use of a smaller radius arcuate section 54 thereby reducing the height of the gravity feed portion 58 to that desired, but still allows the horizontal disengagement of the tape cartridge last played from the next higher tape cartridge prior to vertical movement of the last played tape cartridge on the arcuate portion of the track 54. In order to provide the motive force for moving the cartridges around the track a wheel 60 may be provided on the outside of each set of tracks and which are suitably driven by a driving wheel 62 intermeshing with the wheels 60 and which are in turn driven by a suitable motor which will be more fully described hereinafter. An arm 64 is carried by each wheel 60 and as best seen in FIGURE 3 the arms 64 have an offset portion 66 which is offset inwardly adjacent the track 50 so as to engage the protruding support rods 16 which carry the tape cartridges 14. Thus, as the wheel 60 is rotated, the arm rotates about the track 50 moving the cartridges 14. However, while the offset portions 66 of the arms 64 are to avoid following the contour of the gravity feed track 58 and thus avoid contacting the rod supports 16 and protruding therefrom, the offset portion 66 should follow the contour of the horizontal track portion 52, the arcuate section 54 and the top horizontal portion 56. Of course, this could be done by making the length of the offset portion 66 sufficiently long so as to cover these track portions as the arm 64 is rotated. However, if the arm 64 and offset portion 66 were sufficiently long to cover all of said track portions as the arm is rotated, the arm 64 will, depending on the spacing of the tracks 50, hit the tape player machine 12 when it passes over the track portion 52. Therefore, a suitable mechanism is provided to control the radial movement of the arm 64 over the track 50.

Thus, as best seen in FIGURE 4, an arm guide 68 is provided which guides the movement of a pin 70 in one end of the arm 64. Otherwise, the arm 64 is slidably secured to the wheel 60 in a slidable support 74 (FIGURE 3) for radial movement inwardly and outwardly in response to the movement of the pin 70 in the guide 68.

As in the simplified embodiment of FIGURE 7, as the wheel 60 and the arm 64 are rotated in a clockwise direction they will remove the tape cartridge which is in the playing position at the extreme right end 80 of the lower horizontal track portion 52, move the cartridge around the arcuate track portion 54 and deposit it into the downwardly inclining gravity feed portion 58. At that time, the rotation of the wheel 60 will be reversed causing the arm 64 and its offset portion 66 to retrack its steps in a counterclockwise rotation over the lower horizontal track 52. However, at this time the next lower tape cartridge will have traveled from the gravity feed portion 68 down onto the horizontal track 52. The offset 66 will contact this next tape cartridge and move it towards the extreme end 80 of the horizontal track 52 and thus into playing position in the playing machine 12 at which time the wheel 60 and arm 64 will stop.

Still another type of drive means may be utilized as best seen in FIGURE 10 to provide the means for moving the cartridges about the track 50. Thus two wheels 200 and 202 are provided which may be suitably driven. A belt or chain 204 rides about the periphery of the wheels 200 and 202 and carries an arm 206 which follows the contour of the horizontal and arcuate portions of the track 50, but which avoids the gravity feed portion. This type of drive has the advantage of not having to utilize the track guide 68 of FIGURE 4 in having the arm follow the desired path of travel.

Referring to FIGURES 2 and 3 a track stop 17 may be provided on each of the support rods 16 to ride on the outside of the track 50 and thus securely align the tape cartridges 14 in position between the tracks.

Referring still to FIGURE 4, a pair of single pole double throw electrical switches 83 and 84 or a double pole double throw gauged switch are positioned adjacent the top of the downwardly directed gravity feed track portion 58 so as to be encountered by the rod 16 of the tape cartridges as they pass into the guide portion 58 so as to reverse the rotation of the wheel 60. Similarly, a double pole double throw electrical switch having switches 82 and 85 are positioned at the end 80 of the lower horizontal track portion 52 to stop the rotation of the wheel 60 after a cartridge has been placed in playing position at the end 80 of track portion 52.

Referring now to FIGURE 5, the electrical schematic for an electrical control system for automatically controlling, loading, and unloading the tape cartridges 14 from the playing machine 12 is best seen. In this the playing machine 12, and the electric motor 92 which is suitably connected to and drives the wheels 62 (FIGURE 4) in any suitable manner are suitably controlled and actuated at desired intervals.

A timeclock 97 is provided which controls the time operation of both the player 12 and the cartridge changer 10 by controlling power switch 96 which supplies the power from a suitable electrical source. In a normal business establishment, the timer 97 would close the switch 96 at the beginning of the day's business and open it at the end of the day's business, so that the player and cartridge changer would be operable during the normal business hous of say, from 8:00 to 5:00.

In addition, the time element 97 includes a thermal element 94 which actuates a line switch 106 to provide power to the player 12 as well as to the cartridge chamber control circuit. The thermal element 94 lags behind and bypasses the operation of the switch 96 by approximately 15 seconds for reasons which will more clearly appear hereinafter.

In addition, the timer 97 controls another pair of switches 86 and 98 which are actuated at periodic intervals to change the tape cartridges after they have been played. For example, on a loop tape cartridge which has three hours playing time, the switches 86 and 98 would be actuated, for example in a business establishment desiring playing time from 8:00 to 5:00, at 8:00, 11:00, 2:00 and 5:00.

Relays 100 and 102 are relays which when alternately energized actuate a reversing switch 104 which reverses the drive of tape cartridge motor 92.

Assuming that timer 97 has been actuated and has closed switch 96 and thermal switch 106, the wire leads 110 and 112 now provide an electrical source to the machine player 12 as well as to the cartridge changer control circuit. In addition, motor 92 is connected to one of the power leads 110 and the other three motor leads 113, 114 and 115 are connected through the reversing switch 104 which when alternately actuated provide power to lines 113 and 115, respectively, while shorting lines 114 and 115, and 114 and 113, respectively. That is, in the reversing switch 104, the contact 118 either contacts line 113 or 115 to provide the second power connection to the motor 92 while contact 120 contacts line 115 and 113 respectively to short out the middle motor lead 114. The line between contacts 118 and 120 shown on the drawing is not an electrical connection but is merely a mechanical reversing connection.

A filament circuit 122 is connected to the feeder filament of the audio output amplifier (not shown) of the player machine 12 and includes switches 82 and 86 which form a two-way switch circuit for cutting off the filament power to the audio output amplifier to cause a fade out and fade in of sound instead of an undesirable abrupt on and off sound change during the changing of tape cartridges, as will be more fully discussed hereinafter.

Referring now to FIGURES 4, 5 and 7, and assuming that the cartridge changer apparatus 10 is in a position with a cartridge in playing position, such as cartridge 36 in FIGURE 7, and with the arms 30 and 64 in a stopped position adjacent said playing cartridge, we will assume that the cartridge has just finished playing and the beginning of a change of cartridge cycle starts. Thus, the timer 97 will actuate switches 86 and 98 to the left hand position. The movement of switch 86 will cut off the filament circuit 22 to the audio output amplifier of the playing machine 12 thereby providing a fade out of sound instead of an undesirable abrupt cut off of sound. The movement of the switch 98 to the left hand position will energize relay 102 from the power leads 110 and 112 through switches 98 and 84. Energization of relay 102 actuates reversing switch 104 to energize motor 92 in a direction to cause clockwise rotation of the arm 30 (FIGURE 7) or the wheel 60 and arm 64 (FIGURE 4) so that the arms will, on making a complete revolution, push the cartridge which has just finished playing out of the playing position around the arcuate tracks 28 and 54, respectively, and deposit the played cartridge into the gravity track portions 24 and 58 respectively. The rod 16 on the tape cartridge will on entering the gravity feed track portion contact and actuate electrical switches 83 and 84. The movement of switch 84 to the right hand position will de-energize relay 102 and stop arm drive motor 92. However, the movement of electrical switch 83 to the right hand position will energize relay 100 thereby reversing the motor 92 and causing the arm 30 (FIGURE 7) or the wheel 60 and arm 64 (FIGURE 4) to rotate in a counterclockwise direction thereby engaging the supporting rods 16 of the next lower cartridge which is now at the bottom of the gravity feed track portions and push that cartridge into playing position. The movement of the lowest cartridge to the right hand end of the feeder tracks 26 (FIGURE 7) and 52 (FIGURE 4) will contact and actuate electrical switches 82 and 85. The movement of switch 85 to the left hand position will de-energize relay 100 and stop motor 92. The movement of switch 82 in the left hand position will again energize the audio output amplifier filament circuit 122 allowing the player to fade in the music from the tape instead of providing an abrupt on sound.

Preferably, the actuation of the timing switches 98 and 86 by the timer 97 is so set that the last tripping, say at 5:00 p.m. will occur at the same time as the power cut-off of switch 96. However, a sufficient amount of time, such as 15 seconds delay, as provided in the thermal switch 106 enables the arm 30 (FIGURE 7) or the wheel 60 and arm 64 (FIGURE 4) to rotate more than one revolution so as to engage the tape cartridge which has been playing and remove that cartridge from the playing position, but is not a sufficient length of time to insert another cartridge into the playing position. This is to prevent the rubber drive wheel (not shown) of the playing machine 12 from pressing against the tape when the machine is not in use and forming undesirable indentations therein.

The control circuit shown in FIGURE 5 will thus automatically control the starting, stopping, and tape cartridge changing as set by the timing switches in the timer 97.

While the control circuit of FIGURE 5 is satisfactory for those players 12 which operate automatically in starting and stopping themselves by the actuation of a tape cartridge into and out of the playing position, other types of tape playing machines have a lever which must be moved or reset either in a single direction or in both directions to actuate the player machine on either loading and/or unloading a tape cartridge.

For instance, and referring to FIGURES 1 and 6, some playing machines 12 have a player lever 120 which while automatically moving to the right and starting the playing machine on insertion of a tape cartridge, must be manually moved to the left to disengage the player from the tape cartridge before the cartridge is removed from the playing machine 12. One such cartridge playing machine having such a manually actuated player lever 120 is known as the Programmer. Therefore, in order to automatically change cartridges and play the machine 12 a suitable mechanism must be provided to disengage the player lever 120 at the end of playing each tape. Referring specifically to FIGURE 6, a lever mechanism is provided which is actuated by a pin 130 connected to the rotating wheel 60 (or the arm 30 of FIGURE 7) at the proper time during each cycle. A suitable support member 132 is provided adjacent lever 120 on which a first movable lever arm 134 is adapted to pivot on pin 136 and which when moved in a clockwise direction moves the player lever 120 to the left to disengage the player from the tape cartridge. Similarly a lever 136 which is pivotably supported about pin 138 from the support member 132 is adapted to contact and rotate lever 134 in a clockwise direction when lever 136 is moved in a counterclockwise direction by the movement of pin 130 and wheel 60. Thus, assuming the end of the playing of a tape cartridge has occurred and the wheel 60 is actuated to rotate a full cycle to disengage the cartridge from the player 12, the pin 130 will first contact lever 136 which in turn rotates the lever 134 in a clockwise direction to move the player switch 120 to the left and disengage the player from the tape cartridge. After the wheel 60 makes a full revolution and then removes the played cartridge from the player 12, the pin 130 will have no effect on the movement of the levers 136 and 134 and player lever 120 as the switch 120 will still be in the left hand position as shown in the dotted outlines. After the arm 64 has disengaged the played tape cartridge and deposited it into the gravity feed portion of the track the wheel 60 and arm 64 or arm 30 will be reversed and moved in a counterclockwise direction during which time the pin 130 will again be positioned on the side of lever 136 as shown in FIGURE 6. The arm 64 (FIGURE 4) or arm 30 (FIGURE 7) will move a tape cartridge into the playing machine 12 at which time the arm 120 will automatically move in a right hand direction, as shown in the solid lines in FIGURE 6, caused by the player 12. Levers 136 and 134 as shown in the solid outlines in FIGURE 6 are now reset in preparation for the next cycle.

However, some playing machines 12 such as the type sold under the trademark "Viking," while having a player lever 120 does not move that switch in either direction by the action of the player, and instead the lever 120 must be manually or otherwise actuated each time after a tape cartridge is inserted into and prior to the removal of a tape cartridge from the player 12. Therefore, in order to make such a machine automatic, additional power and control means must be provided for automatically actuating the player lever 120 in both directions. Referring to FIGURE 9, a motor 140 may be provided having a worm gear shaft 142 on which rides a suitable nut 144 which is connected to the lever 120 and threaded on the worm screw 142. Thus as the motor rotates in one direction the lever 120 is also moved in one direction and as the motor 140 is reversed, the lever 120 is similarly reversed.

Referring now to the control circuit for the automatic cartridge changer 10, the player 12, and the additional lever control motor 140, the circuit generally includes the features and operation of FIGURE 5 with additional control elements and switches to control and actuate the motor 140 at the proper time.

Referring particularly to FIGURE 8, which is the electrical schematic for the electrical control system for automatically controlling, unloading, and loading tape cartridges 14 into and from a playing machine 12 and for automatically actuating the lever switch 120 of the playing machine 12. A time clock 99 is provided which controls the time operation of both the player 12 and the cartridge changer 10. Timer 99 controls the main power switch 96, which supplies the power from a suitable electric source. In addition, the timer 99 controls a pair of switches 86 and 160, which are actuated at periodic intervals to change the tape cartridge after it has been played. As for example, as previously described in a business establishment at 8:00, 11:00, 2:00 and 5:00. The electric switches 83 and 84 are physically positioned as in the electrical control system of FIGURE 5 at the top of the gravity feed portion of the track and thus actuated each time a cartridge is dropped into the gravity feed portion of the track (FIGURES 4 and 7). Switches 85 and 158 are physically positioned at the right hand end of the player feed portion of the track, as best seen in FIGURES 4 and 7 and are actuated each time a cartridge is pushed into playing position in the player. Referring particularly to FIGURE 9, the electrical switches 150 and 152 are positioned so as to be actuated by movement of the player lever 120 to the extreme left hand direction, and electrical switches 154 and 156 are positioned so as to be actuated each time the player lever 120 moves to the extreme right hand position.

The lever motor 140 has suitable power controls similar to that previously described for the motor 92 and generally include a reversing switch 166, and control leads 168, 170 and 172, the actuation of which is controlled by relays 162 and 164.

Assuming that the timer 99 has been actuated and thus closes switch 96, and the thermal element switch 106 has been closed, the wire leads 110 and 112 now provide an electric source to the machine player 12 as well as to the cartridge changer control circuit, and to the motor 140 for actuating the player lever 120. Referring now to FIGURES 4, 7, 8 and 9, and assuming that the cartridge changer apparatus 10 is in position with the cartridge in playing position, such as cartridge 36 in FIGURE 7, and with the arms 30 and 64 in a stopped position adjacent the playing cartridge, we will assume that the cartridge has just finished playing and beginning of the change of cartridge cycle starts. Thus, the timer 99 actuates switches 160 and 86 to the left hand position. The movement of the switch 86 will cut off the filament circuit 22 to the audio output amplifier (not shown) of the playing machine 12 thereby fading out the sound. The movement of the switch 160 to the left hand position will energize relay 164 from the power leads 110 and 112 through the switches 160 and 152. Energization of relay 164 actuates reversing switch 166 to energize the lever motor 140 in a direction, as best seen in FIGURE 9 to move the nut 144 to the left thereby moving the player lever 120 to the left and disconnecting the player from the tape in the cartridge so that the cartridge may be removed. The lever 120 is thus moved to its extreme left hand position where it contacts electrical switches 150 and 152 (FIGURE 9) so as to actuate those switches. The actuation of switch 152 to the right hand position in FIGURE 8 disconnects relay 164 and stops motor 140. At this position the tape machine drive wheel (not shown) is thus removed from the tape cartridge 14 and the tape cartridge can now be removed by the tape cartridge changer 10. The actuation of switch 150 to the left hand position energizes relay 102 actuating cartridge changer drive motor 92 through the reversing switch 104 as has been previously described. The motor 92 is energized in a direction to cause clockwise rotation of the arm 30 (FIGURE 7) or the wheel 60 and arm 64 (FIGURE 4) so that the arm will on making a complete revolution push the cartridge which has just finished playing out of playing position and around the arcuate tracks 28 and 54, respectively, and deposit the played cartridge into the gravity track portions 24 (FIGURE 7) or 58 (FIGURE 4). The protruding rods 16 on the tape cartridge will on entering the gravity feed track portions contact the electrical switches 83 and 84 (FIGURES 4 and 7) and actuate those switches.

Referring still to FIGURE 8, the movement of switch 84 to the right hand position will de-energize relay 102 and stop cartridge drive motor 92. However, the movement of electrical switch 83 to the right hand position will energize relay 100 thereby reversing motor 92 and causing the arm 30 (FIGURE 7) or the wheel 60 and arm 64 (FIGURE 4) to rotate in a counterclockwise direction thereby engaging the supporting rods 16 of the next lower cartridge which is now at the bottom of the gravity feed track portion and pushing it into playing position.

The movement of the lowest cartridge to the right hand end of the feeder tracks 26 (FIGURE 7) and 52 (FIGURE 4) will contact and actuate switches 85 and 158, which are positioned at the right hand end of the track (FIGURES 4 and 7). The movement of switch 85 to the left hand position will de-energize relay 100 and stop cartridge changer drive motor 92. However, the movement of switch 158 to the left hand position will energize relay 162 and cause lever motor 140 to rotate in a direction to move the nut 144 and lever 120, as best seen in FIGURE 9, to the right hand position. When the lever 120 has reached the right hand position it will contact and actuate switches 154 and 156 (FIGURE 9). The movement of switch 156 will stop motor 140. When the lever is thus in the right hand position as shown in FIGURE 9, the drive wheel (not shown) of the player 12 will thus be in contact with the tape in the tape cartridge 14. And the movement of switch 154 to the left hand position will again energize the audio output amplifier filament circuit 122 allowing the player 10 to fade in the music from the tape instead of providing an abrupt sound.

As in FIGURE 5, the actuation of the power switches 86 and 160 is set so that the last tripping, say at 5:00 p.m. will occur at the same time as the power cutoff by switch 96. However, the 15 second delay as provided in the thermal switch 106, will allow the lever motor 140 time to deactuate the lever 120 to the left hand position, and will enable the arm 30 (FIGURE 7) or the wheel 60 and arm 64 (FIGURE 4) to rotate more than one revolution so as to engage the tape cartridge which has been playing and remove it from playing position, but is not a sufficient lengh of time to allow the cartridge changer to insert another cartridge into playing position, all as described in connection with FIGURE 5. Thus the changer may, say at 5:00 p.m., be left in a position such as FIGURE 1 where one cartridge 14 is removed from the playing position, but not deposited on top of the cartridge stack.

In operation, a plurality of tape cartridges 14 are inserted into the tape cartridge changer 10 by the track insertion portion 22 and allowed to stack up in the gravity feed portion 58 (FIGURE 4) or 24 (FIGURE 7). The support rods 16 protrude through the outside of the tracks 50 (FIGURE 4) or 20 (FIGURE 7) and the rod stops 17 engage the outer edge of the tracks (as best seen in FIGURE 3) to properly align the cartridges 14.

The description of operation will now be given for the electrical control circuit shown in FIGURE 8 which generally includes the basic control circuit shown in FIGURE 5 as well as providing the additional control for actuation of the player lever 120 on those players requiring such resetting. Assuming that the apparatus 10 is in the position as shown in FIGURE 1, which position is the one in which the changer was left at the end of the previous day's playing, that is with no cartridge in playing position, but the last retracted cartridge may be somewhere between the playing position and before being fed into the gravity feed portion of the track. Therefore, assuming at the beginning of the day that the timer 99 has been actuated and thus closes switch 96 and the thermal switch 106 has been closed the wire leads 110 and 112 now provide an electric source to the machine player 12, the cartridge changer control circuit, and to the motor 140 for actuating the player lever 120. It is to be noted that in this position the lever 120 will be to the extreme left hand point of travel as viewed in FIGURE 9 and the switch 150 as shown in FIGURE 8 is in the left hand position and the switch 152 is in the right hand position.

Thus, when the timer 99 actuates the switch 96 and after the time delay of the thermal element 94 which cuts in the thermal switch 106 power is transmitted to switches 86 and 160 which have also been actuated by the timer 99. The movement of switch 86 does not affect the filament circuit 22 as the switch 154 in that two-way circuit is in the right hand position. And since switch 152 is in the right hand position no power will flow through switch 160. However, the energization of the control circuit continues the energization of relay 102 from the previous day through switches 150 and 84 thereby actuating cartridge changer to continue to drive motor 92 through the reversing switch 104 as previously described. The motor 92 is continued to be energized in a direction to cause continued clockwise rotation of the arm 30 (FIGURE 7) or the wheel 60 and arm 64 (FIGURE 4) so that the arm will continue to carry the previously played cartridge around the arcuate tracks 28 or 54, respectively, and deposit the played cartridge into the gravity track portions 24 (FIGURE 7) or 58 (FIGURE 4). The cartridges will on entering the gravity feed track portions contact the electrical switches 83 and 84 (FIGURES 4 and 7) and actuate those switches.

Still referring to FIGURE 8, the movement of switch 84 to the right hand position will de-energize relay 102 and stop cartridge drive motor 92. However, the movement of electrical switch 83 to the right hand position will now energize relay 100 thereby reversing motor 92 and causing the arm 30 (FIGURE 7) or the wheel 60 and arm 64 (FIGURE 4) to rotate in a counterclockwise direction thereby engaging the supporting rods 16 of the next lower cartridge which is now at the bottom of the gravity feed track portion and pushing it into playing position. The movement of the lowest cartridge to the right hand end of the feeder tracks 26 (FIGURE 7) and 52 (FIGURE 4) will contact and actuate switches 85 and 158 which are positioned at the end of those tracks (FIGURES 4 and 7). The movement of switch 85 to the left hand position will de-energize relay 100 and stop the cartridge changer drive motor 92. However, the movement of switch 158 to the left hand position will energize relay 162 and cause lever motor 140 to rotate in a direction to move the nut 144 and lever 120, as best seen in FIGURE 9, to the right hand position. When the lever 120 has reached the right hand position it will contact and actuate switches 154 and 156 (FIGURE 9). The movement of the switch 156 will stop motor 140. When the lever is thus in the right hand position, as shown in FIGURE 9, the drive wheel (not shown) of the player 12 will thus be in contact with the tape and the tape cartridge 14. And the movement of the switch 154 to the left hand position will again energize the audio output amplifier filament circuit 122 allowing the player 10 to fade in the music from the tape. The playing of the cartridge will continue until interrupted by the actuating of switches 86 and 160 by the timer 99 at which time the cycle will again proceed to change cartridges.

It is believed that the method of the invention is apparent from the foregoing description of the presently preferred embodiments of the apparatus of the invention. The method, however, comprises the steps of changing a plurality of tape cartridges on a cartridge player by stacking a plurality of cartridges above the cartridge player, moving the lowest cartridge into playing position on the tape cartridge player, after the lowest cartridge has been played removing it from the playing position and moving it until it clears the stack of cartridges, moving the stock of cartridges downwardly by gravity feed, placing the removed cartridge on the top of the cartridge stack, and moving the then lowest cartridge into playing position on the tape cartridge player. The method further comprehends vertically stacking the cartridges one above the other on the cartridge player, transversely moving the lowest cartridge into playing position, and after the last cartridge has been played transversely removing it from playing position and transversely moving it until it clears the stack of cartridges.

The present invention, therefore, is well adapted to carry out the objects and attain the ends and advantages as well as others inherent therein. While presently preferred embodiments of the invention have been given for the purpose of disclosure, numerous changes in the details of construction, arrangement of parts, and steps of the process may be made which will readily suggest themselves to those skilled in the art and which are encompassed within the spirit of the invention and the scope of the appended claims.

What is claimed is:

1. An apparatus for automatically changing a plurality of tape cartridges on a cartridge player comprising,
- a cartridge supporting track having an arcuate portion, a gravity feed portion, and a player feeder portion,
- supports on each side of said cartridge and positioned for movement in said track,
- rotatable means adjacent said track,
- means connected to said rotatable means to move the individual cartridges around said arcuate portion of said track and into said gravity feed portion when moved in one direction, and to move the lowest cartridge in said gravity feed portion when moved in the other direction, and
- power means for moving said rotatable means first in one direction and then the other direction.

2. The invention of claim 1 wherein the means connected to said rotatable means includes an arm.

3. The invention of claim 1 wherein the supports are rods which are adapted to slide in said track.

4. The invention of claim 1 wherein the supports are connected to the cartridges above the center of gravity of said cartridges.

5. The invention of claim 1 including means to periodically actuate and deactuate the power means.

6. An apparatus for automatically changing a plurality of tape cartridges comprising,
- a cartridge supporting track including,
  - an arcuate portion supporting the cartridges as they are moved upwardly,
  - a downwardly inclined gravity feed portion which receives the cartridges from the arcuate portion and allows them to feed downwardly, and
  - a player feed portion at the lower end of the gravity portion for supporting the cartridges as they are moved into and out of playing position,
- rotatable supports on each of said cartridges for movement in said track,
- rotatable means adjacent said track,
- means connected to said rotatable means for moving said cartridges about said track,
- means for rotating said rotatable means first in one direction and then in the other direction.

7. The invention of claim 6 including timing means for periodically actuating said rotating means.

8. The invention of claim 7 including means automatically setting and resetting the cartridge player as the cartridges are loaded and unloaded from the player.

9. The invention of claim 7 including, lever means connected to said rotatable means for resetting the player after each cartridge has finished playing.

10. An apparatus for automatically changing a plurality of stacked tape cartridges comprising,
- a rotatable shaft,
- means connected to the shaft for rotating said shaft first in one direction and then in the other direction at predetermined time intervals,
- an arm carried by said shaft in a rotary path,
- a cartridge carrying track including,
  - an arcuate portion aligned parallel to a part of the rotary path of travel of said arm,
  - a downwardly directed gravity feed portion in communication with said arcuate portion but removed from a superinscribed circle containing said arcuate portion, and
  - a player feed portion in communication with the arcuate portion and with the lower end of the gravity feed portion, and
- support means on each side of said cartridge and positioned in said track.

11. An apparatus for automatically changing a plurality of stacked tape cartridges comprising,
- rotatable means,
- means connected to said rotatable means for rotating said rotatable means first in one direction and then the second direction at predetermined time intervals,
- an arm carried by said rotatable means adjacent each end of said rotatable means, said arms having a portion adjacent its free end which are each offset toward each other,
- a cartridge supporting track spaced adjacent of and interiorly of each arm including,
  - an arcuate portion positioned adjacent a part of the rotary path of travel of said offset portion of the arm,
  - a downwardly directed gravity feed portion in communication with the arcuate portion but removed from the path of travel of the arm offset, a player feed portion in communication with the arcuate portion and the bottom of the gravity feed portion, supports on each side of said cartridges and adapted to be carried in and extend through said tracks and be contacted by said offset portion of said arms.

12. An apparatus for automatically changing a plurality of tape cartridges on a tape playing machine comprising, two upwardly extending cartridge supporting tracks including, a first horizontal portion, an arcuate portion connected to said horizontal portion and directed upwardly, a second horizontal portion connected to the upper end of said arcuate portion, and a downwardly directed gravity feed portion connected between the first and second horizontal portions, support means on each side of said tape cartridges adapted to be supported in said tracks and support said cartridges between said tracks, rotatable means adjacent each of said tracks, an arm supported by each of said rotatable means, means causing the outer end of said arm to follow the horizontal portions and arcuate portion of said track, and to avoid the gravity feed portion, means connected to said rotatable means to move said rotatable means, arms and individual cartridges around said first horizontal portion, arcuate portion, and into said gravity feed portion, and to reverse said rotatable means and arms and move the lowest cartridge into said player.

13. The invention of claim 12 wherein the supports are connected to the cartridges above the center of gravity of said cartridges.

14. An apparatus for automatically changing a plurality of tape cartridges on a tape playing machine comprising, two cartridge supporting tracks extending vertically and spaced on each side of said tape cartridges including, an arcuate portion extending upwardly for receiving the previously played cartridge and supporting said cartridge as it is moved out of playing position, a downwardly directed gravity feed portion in communication with said arcuate portion for supporting the cartridges waiting to be played and feeding them toward the player, a player feed portion connected to the lower end of said gravity feed portion and in communication with the arcuate portion, means on either side of said cartridges for supporting said cartridges by and between said tracks, cartridge moving means adapted to move adjacent said arcuate and feed portions of said track, and means for moving said cartridge moving means first in one direction adjacent said arcuate and feed track portions and then in the opposite direction adjacent said arcuate and feed track portions at predetermined time intervals.

15. The invention of claim 14 wherein the supports are connected to the cartridges above the center of gravity of said cartridges.

16. An apparatus for automatically changing a plurality of tape cartridges on a tape playing machine comprising, two cartridge supporting tracks extending vertically and spaced on either side of said tape cartridges including, a first horizontal portion, an arcuate portion connected to said first horizontal portion and extending upwardly for receiving the previously played cartridge and supporting said cartridge as it is moved upwardly, a second horizontal portion connected to the upper end of said arcuate portion, and a downwardly directed gravity feed portion connected between the first and second horizontal portions, support means on each side of said tape cartridges adapted to support said cartridges by and between said tracks, cartridge moving means moving adjacent said first horizontal, arcuate, and second horizontal track portion but avoiding said gravity feed track portions, and means for moving said cartridge moving means first in one direction adjacent said track first horizontal, arcuate, and second horizontal portions and then in the opposite direction adjacent said same track portions at predetermined time intervals.

17. The invention of claim 16 wherein the cartridge moving means includes, two rotating wheels, a chain engaging the outer periphery of said wheels, an arm carried by the chain.

18. The invention of claim 17 wherein the supports are connected to the cartridges above the center of gravity of said cartridges.

19. An apparatus for automatically changing a plurality of tape cartridges on a cartridge player comprising, two cartridge supporting tracks in a plane extending vertically on each side of said tape cartridges including, an arcuate portion extending upwardly for supporting the previously played cartridge as it is moved out of playing position, a downwardly inclined gravity feed portion in communication with said arcuate portion for supporting the cartridges not being played and feeding them downwardly toward the player, a horizontal player feed portion connected to the lower end of said gravity feed and in communication with the arcuate portion, support rods on each side of said cartridges and above the center of gravity of said cartridges and extending through each of said tracks for supporting said cartridges from the tracks, rotatable power means adjacent each track on the side opposite the cartridges, an arm carried by said power means adjacent each of said tracks on the side opposite said cartridges, said arms having an offset portion adjacent their free ends, which offsets are adapted to rotate adjacent the arcuate and feed portions of said tracks while avoiding the gravity feed portions, electrical means connected to said rotatable power means for moving said power means first in one direction and then in the other direction, switch means in said electrical means for reversing said electrical means on predetermined movement of said cartridges, and timer means actuating said electrical means at predetermined time intervals.

20. The method of changing a plurality of tape cartridges on a cartridge player comprising, stacking a plurality of cartridges one above the other on the cartridge player, moving the lower cartridge into playing position, removing the lowest cartridge after it has been played from the playing position and then onto the top of the stack thereby allowing the remainder of the stacked cartridges to move downwardly, and moving the then lowest cartridge into playing position.

21. The method of changing a plurality of tape cartridges on a cartridge player comprising, stacking a plurality of cartridges one above the other on the cartridge player, transversely moving the lowest cartridge into playing position on the tape cartridge player, after the lowest cartridge has been played, transversely removing it from the playing position and the bottom of the cartridge stack and placing it on the top of the cartridge stack thereby allowing the cartridge stack to move downwardly, and transversely moving the now lowest cartridge into playing position on the tape cartridge player.

22. The method of changing a plurality of tape cartridges on a cartridge player comprising, stacking a plurality of cartridges vertically one above the other above the cartridge player, transversely moving the lowest cartridge into playing position on the tape cartridge player, after the lowest cartridge has been played, transversely moving it from the playing position and transversely moving it until it clears the stack of cartridges, moving the stack of cartridges downwardly by gravity feed, placing the removed cartridge on the top of the cartridge stack, transversely moving the then lowest cartridge into playing position on the tape cartridge player, and periodically repeating the last four steps.

23. An apparatus for automatically changing a plurality of tape cartridges comprising, two upwardly extending cartridge supporting tracks and spaced one on each side of said tape cartridges including, an arcuate portion extending upwardly for receiving the previously played cartridge and supporting said cartridge as it is moved out of playing position, a downwardly directed gravity feed portion in communication with said arcuate portion for supporting the cartridges waiting to be played and feeding them toward the player, a player feed portion connected to the lower end of said gravity feed portion and in communication with the arcuate portion, means on either side of said cartridges for supporting said cartridges by and between said tracks, cartridge moving means for moving said cartridges on said track, and an electrical control and power means for controlling the movement of said cartridge moving means at predetermined time intervals for automatically changing said tape cartridges.

24. The invention of claim 23 wherein the player includes an on-off playing switch including, electrical power means connected to said on-off playing switch, electrical control means for actuating and deactuating said on-off switch automatically upon the loading and before the unloading of a tape cartridge into the player.

25. The invention of claim 23 including a time delay switch in the cut off of said electrical control circuit having a sufficient time delay for allowing the tape cartridge to be removed from the player but not sufficient to allow another cartridge to be inserted into said player whereby player will not have a tape cartridge in the playing chamber during shut down periods.

References Cited by the Examiner

UNITED STATES PATENTS 3,025,011 3/1962 Camras ---------- 242—55.13

FRANK J. COHEN, *Primary Examiner.*

L. D. CHRISTIAN, *Assistant Examiner.*